(12) United States Patent
Wang et al.

(10) Patent No.: US 8,971,859 B2
(45) Date of Patent: Mar. 3, 2015

(54) METHOD FOR BLOCKING CRANK CALLS BY USING CLOUD COMPUTING AND A SYSTEM THEREOF

(75) Inventors: Wei Wang, Beijing (CN); Yu Lin, Beijing (CN); Shihong Zou, Beijing (CN); Xinyang Li, Beijing (CN)

(73) Assignee: Netqin Mobile (Beijing) Co., Ltd, Beijing (CN)

( * ) Notice: Subject to any disclaimer, the term of this patent is extended or adjusted under 35 U.S.C. 154(b) by 118 days.

(21) Appl. No.: 13/482,799

(22) Filed: May 29, 2012

(65) Prior Publication Data

US 2012/0309365 A1 Dec. 6, 2012

(30) Foreign Application Priority Data

Jun. 1, 2011 (CN) .......................... 2011 1 0146027

(51) Int. Cl.
| | | |
|---|---|---|
| *H04W 4/00* | (2009.01) | |
| *H04L 29/06* | (2006.01) | |
| *H04M 1/57* | (2006.01) | |
| *H04M 1/663* | (2006.01) | |
| *H04W 4/16* | (2009.01) | |
| *H04M 3/436* | (2006.01) | |
| *H04M 3/42* | (2006.01) | |

(52) U.S. Cl.
CPC .............. *H04L 63/101* (2013.01); *H04M 1/57* (2013.01); *H04M 1/663* (2013.01); *H04W 4/16* (2013.01); *H04M 3/436* (2013.01); *H04M 3/42059* (2013.01)
USPC ................................... 455/414.1; 379/207.02

(58) Field of Classification Search
USPC ...................... 455/411, 414.1, 415, 418, 466; 379/142.06, 210.02, 211.01, 88.22, 379/207.02, 539.1; 370/271; 726/22
See application file for complete search history.

(56) References Cited

U.S. PATENT DOCUMENTS

| | | | |
|---|---|---|---|
| 8,326,334 B2* | 12/2012 | Kim et al. ...................... 455/466 |
| 2007/0165821 A1* | 7/2007 | Altberg et al. ........... 379/210.02 |
| 2009/0106318 A1* | 4/2009 | Mantripragada et al. .. 707/104.1 |
| 2010/0124916 A1* | 5/2010 | Kim et al. ...................... 455/418 |
| 2010/0172482 A1* | 7/2010 | Fotta ........................ 379/207.02 |
| 2010/0205668 A1* | 8/2010 | Jeon ................................. 726/22 |
| 2011/0294478 A1* | 12/2011 | Trivi et al. .................... 455/415 |
| 2012/0260262 A1* | 10/2012 | Tillier ............................ 719/313 |
| 2013/0109356 A1* | 5/2013 | Patterson et al. ............. 455/411 |
| 2013/0203397 A1* | 8/2013 | Vidal et al. .................... 455/418 |
| 2013/0254160 A1* | 9/2013 | Rose ............................. 707/609 |

* cited by examiner

*Primary Examiner* — Kwahar Iqbal
(74) *Attorney, Agent, or Firm* — Scully, Scott, Murphy & Presser, P.C.

(57) ABSTRACT

The present disclosure provides a method for blocking crank calls by using cloud computing and a system thereof. In the method, a client(s) uploads a blacklist to a server; the server makes statistic according to blacklist data uploaded by the client(s) and determines a particular phone number be a crank phone number, generates an anti-crank policy and updates the generated anti-crank policy to the client(s); when receiving a call or a message from the crank phone number, the client executes the anti-crank policy.

4 Claims, 4 Drawing Sheets

METHOD FOR BLOCKING CRANK CALLS BY USING CLOUD COMPUTING AND A SYSTEM THEREOF

FIELD OF THE INVENTION

The invention relates to mobile communication field, and more particularly relates to a method for blocking crank calls by using cloud computing and a system thereof.

BACKGROUND OF THE INVENTION

There are many methods for blocking crank calls in the prior art, for example, manual setting a blacklist by a user is a usual way for blocking the crank calls. The user can manually add a phone number from call history, a short message or a contact list or fill a phone number directly in the black list directly. The phone numbers listed in the blacklist are usually regarded as crank calls. The methods above relies on personal subjective judgment and the crank phone number is added manually, which has the advantage of adding the phone number correctly after testing and has the disadvantage of post processing, consuming personal energy, requiring manual adding, wasting time and energy and can not early block the crank calls which have not been received before.

In addition, a method for rejecting a wangiri call (a call that is cut off immediate after call ringing) exists in the prior art. The method adapts determining the time of ring tone of a call; if the time of the ring tone of the call is less than a certain threshold value and simultaneously accords with one or some of the following conditions, the phone number of the call is determined to be a crank phone number. For example, the conditions are as the following: the phone number of an incoming call is not in the phonebook of a cell phone; the phone number of the incoming call is not local; the number of the incoming call is not in the call record, and so on. Such method solves the problem that a user is disturbed by wangiri calls. However, for some promotional phone numbers and prank phone numbers, a receiver needs a long time analysis to determine whether a phone number is a crank phone number or not, which wastes a great deal of time and energy.

At present, blacklists of part cell phone anti-crank products are collected via Internet and correctness of phone number data needs to be examined. It can not determine whether a phone number is being reported maliciously. If the correctness of the phone number can not be verified, the interest of a person who is accused falsely or reported by mistake will be damaged.

In addition, at present, the data of blacklists of parts of cell phone anti-crank products is relatively large. Currently, millions of crank phone numbers are reported in China. It is estimated that more than ten millions of phone numbers would be reported as crank phone numbers in the near future. Researching a database of the crank phone number above requires some time and it is impossible to complete crank phone number investigation in 1 or 2 seconds after receiving a call or a short message. Therefore, it is necessary to improve researching of the blacklist at the client/cell phone or shorten the blacklist.

SUMMARY OF THE INVENTION

In order to solve the problem in the prior art, the invention provides a method for blocking crank calls by using cloud computing. In the method, a server performs cloud computing and determines a crank phone number by analyzing phone numbers of a blacklist uploaded by a cell phone client(s); specific rules of determination are as the following: (1) in a certain time period T, if times that a phone number is added in the blacklist by users of a region exceeds threshold value Mx, the phone number is defined to be a crank phone number of the region;

(2) In a certain time period T, if a phone number is added in the blacklist by users of more than N regions and weighted average of times that the phone number is added in the blacklist by users of N regions exceeds threshold value My, the phone number is defined to be a national crank phone number.

The server can build a regional crank phone number database and/or a national crank phone number database. The server generates an anti-crank policy according to crank phone number data and updates the anti-crank policy to the client(s); when receiving a crank phone number, the client gives an alert that the phone number may be a crank phone number.

Compared with methods for blocking crank calls in the prior art, the invention can solve the problem that part of crank calls can not be warned early; the invention can help the user to predetermine some crank calls involved with larger scope in advance by early warning and update crank call data to the cell phone client side of a user, which saves trouble and is convenient and has enhanced capability of anti-crank.

According to one aspect of the present invention, the invention provides a method for blocking crank calls by using cloud computing. the method includes sending a blacklist to a server by a client(s); making, by the server, statistics according to the blacklist data uploaded by client(s), determining a particular phone number to be a crank phone number, generating an anti-crank policy and updating the generated anti-crank policy to the client(s); when receiving a call or a message from the crank phone number, giving, by the client(s), an alert that the phone number may be a crank phone number.

Alternatively, the client(s) adds a phone number of a crank phone call or a crank short message in the blacklist by selection made by a user. Updating the generated anti-crank policy to the client comprises arranging a regional crank phone number in the blacklist of the client(s) of the region and arranging the national crank phone number in the blacklists of all of the clients of a country; executing the anti-crank policy comprises adapting weak alert for a crank incoming calls or a crank short message, automatically refusing a crank call or a crank short message and/or giving an alert to the user that an incoming call or a short message is the crank one.

Alternatively, the client(s) saves an intercepting record and uploads the intercepting record to the server; the server makes statistics according to the intercepting record uploaded by the client(s), determines a particular phone number to be the crank phone number and generates the anti-crank policy.

Alternatively, making statistic by the server according to the intercepting record uploaded by the client(s) comprises (1) in a predetermine time period T, if times that a phone number is added in the intercepting record by users of a region exceeds threshold value Nx, the phone number is defined to be a crank phone number of the region; and (2) in a predetermined time period T, if a phone number is added in the intercepting record by users of more than N regions and weighted average of times that the phone number is added in the intercepting record by users of N regions exceeds threshold value Ny, the phone number is defined to be a national crank phone number.

The intercepting record includes a record of automatic intercepting a call, which is cut off immediate after call ringing, by the client(s), intercepting record set by the user manually and/or a call refused by the user(s).

The invention further provides a system of blocking crank calls by using cloud computing, which includes at least one client and at least one server; the client is arranged on a mobile communicating device and comprises a client controlling module, a client anti-crank policy module and a client communicating module; the server comprises a server anti-crank policy module, an analyzing module and a server communicating module; the client controlling module communicates with the client anti-crank policy module and the mobile communicating device, the controlling module receives anti-crank controlling instructions from the client anti-crank policy module and controls functions of the mobile communicating device; the client anti-crank policy module communicates with the controlling module and the client communicating module; the anti-crank policy module outputs a anti-crank policy to the controlling module; and the anti-crank policy module records and updates a local crank call record and uploads the local call record to the server; the server receives the local crank call record and stores the record to the server anti-crank policy module; the analyzing module communicates with the anti-crank policy module, makes statics and defines a crank phone number; the defined crank phone number is for generating update of the anti-crank policy. The update of the anti-crank policy is updated to the client anti-crank policy module by the server communicating module.

Preferably, according to one aspect of the invention, the client anti-crank policy module further comprises an intercepting record module and a blacklist storing module;

the intercepting record module communicates with a user module, the blacklist storing module and the client communicating module; after a cell phone user set a phone number as crank phone number via the user module, the phone number is stored in the blacklist storing module; the controlling module automatically defines a call which is cut off immediate after call ringing to be crank and stores the call in an intercepting record;

the client communicating module uploads the intercepting record and a blacklist to the server.

In addition, normal ways for blocking crank calls can only block a limited quantity of phone numbers; however, the method of the present invention can make the quantity of the blacklist phone number data be increased several levels higher, which enhances the capability of anti-crank of a cell phone.

In addition, the invention can solve the problem that some crank phone numbers are not correct. At present, blacklists of part cell phone anti-crank products are collected via Internet and the correctness of the phone numbers data should be examined. The basis of determining a crank phone number by the invention is that the crank phone number is added in the blacklists by a large quantity of users but not reported by only a single user, which is universal and fair.

BRIEF DESCRIPTION OF THE DRAWINGS

Other characteristics and advantages of the present invention appear from or illustrated by the following detailed description given with reference to the accompanying drawings, the accompanying drawings and detailed description of the present invention serve to explain the specific principles of the present invention.

DETAILED DESCRIPTION OF THE INVENTION

Embodiments of the invention will be described hereinafter with reference to the accompanying drawings. While the present invention has been described with respect to exemplary embodiments, it is to be understood that the invention is not limited to those disclosed embodiments. On the contrary, it is intended that the invention not only covers those exemplary embodiments but also covers all such alternations, modifications, equivalents and other embodiments as fall within the spirit and scope of the appended claims of the present invention.

According to one aspect of the present invention, the method for blocking crank calls by using cloud computing, in the method, a client(s) uploads a blacklist to the server; a server makes statistics according to the blacklist uploaded by the client(s), determines a particular phone numbers as a crank phone number, generates an anti-crank policy and updates the generated anti-crank policy to the client(s). When receiving a call (or a message) from the crank number, the client gives an alert that the phone number may be a crank phone number.

Alternatively, blacklist data uploaded by the client(s) can includes a blacklist phone number, the time of adding a phone number in the blacklist and a reporting cell phone number, etc. The client(s) can upload the blacklist to the server automatically or manually. Generally, the blacklist is uploaded manually. When the user enters the cell phone client to check the blacklist, the user can select a function of uploading blacklist The user can set a function of automatic uploading and select uploading period, such as daily, weekly or monthly uploading.

The server can form a blacklist database for storing the blacklist data updated by the client(s). The server makes statistics according to the blacklist data uploaded by the client(s) and determines a particular phone number as crank phone number. Alternatively, the rule for determining a crank phone number can be one of the following conditions: in a certain period, the times that a phone number is added into the blacklist by users of a region exceeds Mx times; in a certain period, a phone number is added into the blacklist by users of more than N regions and weighted average of times that a phone number is added by users of N regions exceeds My times. If one of the conditions is satisfied, the phone number is determined to be a crank phone number. Preferably, satisfying region crank times Mx has priority.

Preferably, the server unifies the format of the uploaded blacklist data at first and stores the blacklist data in the blacklist database. The server can extend data attribution for the stored blacklist data, i.e. supplying region attribution of blacklist phone numbers, region attribution of reporting phone number and attribution of reporting time, etc.

Alternatively, extending data attribution requires a location database. The location database refers that the first 7 digits of a cell phone number is for determining the location, operator network, and so on, of a phone number and is one of identifiers for an operator to manage the cell phone users. For example, for 13800138000, 138 represents that the phone number operator is China Mobile; the service is Global Mobile Communications Card; 0013 represents that the location of the phone number is Beijing.

According to the conditions for determining a crank phone number, the server can form a region crank phone number database and/or national crank phone number database. The server further can form one crank phone number database and determine whether a phone number is a regional crank phone number or a national crank phone number by attribution of every piece of data. For a crank phone number which satisfies two conditions, the attribution of the crank number can be marked both as national crank phone number and regional crank phone number.

Preferably, the server stores the determined crank phone number into the crank phone number database; the crank phone number can generate data format required by the client according to the region and configure it to the application server. When the user initiates manually or updates automatically the anti-crank policy of the client, the anti-crank policy generated by the server is updated to the cell phone client. The anti-crank policy includes the crank phone number database.

Alternatively, the anti-crank policy further includes automatic determining whether a short message is a crank message according to the meaning of the message and/or determining whether a phone number is a crank number according to a user phone number. Updating the anti-crank policy will make the cell phone client intercept a usual crank short message or fraud short message and/or intercept a usual crank phone number in the market better.

Alternatively, the anti-crank policy can associate with regional crank phone numbers and/or national crank phone numbers. For example, if a phone number only belongs to crank phone number of a region, the policy can be configured to the region only. If the phone number belongs to national crank phone number, the policy is configured to all regions of a country.

When the user receives a call or a short message from a crank phone number, the client gives an alert in text on main interface of a cell phone, for example, the phone number may be a crank phone number; or the alert is given in form of an image such as a portrait image, or sound and/or animation.

According to one embodiment of the present invention, when the client receives a call from a phone number, anti-crank policy is applied; at first, the client checks whether the phone number is in the crank phone number database, if the phone number is in the crank phone number database, prompts the user that the phone number is a crank phone number; if the phone number is not in the crank phone number database, gives no alert of crank.

When the client receives a short message from a phone number, anti-crank policy is applied; at first, the client checks whether the phone number is in the crank phone number database of the anti-crank policy, if the phone number is in the crank phone number database, prompts the user that the phone number is a crank phone number; if the phone number is not in the crank phone number database, determines whether the short message is a crank short message according to the meaning of the short message, if the short message is determined that it may be a crank short message, prompts the user that the phone number may be a crank phone number and/or the short message may be a crank short message, if the short message is determined not to be crank short message, gives no alter of crank.

After massive (millions of or even ten millions of) cell phone clients upload blacklists, the accuracy rate for the server to determine a crank phone number is increased greatly.

In addition, in the method of the invention, the blacklist data can be adjusted according to the reporting of the user and further the crank phone number database may be adjusted.

When the user thinks that the alert of crank phone number given by the cell phone client is incorrect, the user can record the phone number which is alerted by mistake and feed the phone number back to the server via the client. For example, after the server receives reporting from the user, if the user reports that the phone number is crank phone number while the anti-crank policy does not give an alert, multiply a certain factor based on the times reported by users so as to increase the total times that the phone number is reported as a blacklist phone number. If the user reports that the content of the anti-crank alert is incorrect and the phone number is not a crank phone number, multiply a certain factor base on the times reported by users so as to decrease the total times that the phone number is reported as a blacklist phone number. The times that the phone number is reported as a blacklist phone number associates directly with determining whether the phone number is crank phone number or not.

Generally, the value of $M_x$ and/or $M_y$ is related to region and time. Alternatively, when the times that a phone number is reported to be incorrect by users accumulates to be a certain value, the server can adjust the value of $M_x$ and/or $M_y$.

Figure 1:
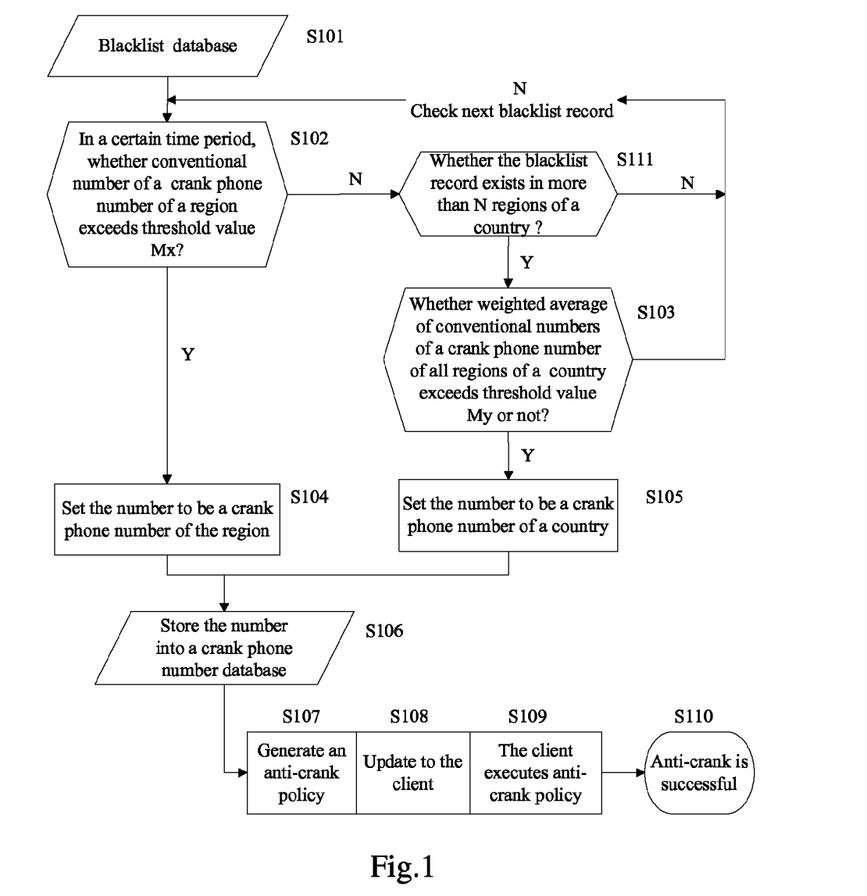
FIG. 1 is a flowchart illustrating a method for blocking crank calls according to an embodiment of the present invention.

Referring to FIG. 1, following description illustrates a method for blocking crank calls according to an embodiment of the present invention.

In step S101, the server forms a blacklist database for storing blacklist data uploaded by users and makes statistics according to the blacklist data uploaded by the users.

In step S102, the server determines whether the times that a phone number in the blacklist database is added to the blacklist by the users of a region in a time period T exceeds the threshold value $M_x$, if the times exceeds the threshold value $M_x$, in step S104 the phone number is set to be a crank phone number of the region; if the times does not overpass the threshold value $M_x$, in step S111 the server determines whether the phone number has been added to the blacklist by users of more than N regions in the certain time period T; if the phone number has been added to the blacklist by the users of more than N regions; in step S103 the server determines whether weighted average of times that the phone number is added to the blacklist by users of N regions exceeds the threshold value $M_y$, if the weighted average of times exceeds the threshold value $M_y$, in step S105 the phone number is set to be a national crank phone number; if the weighted average of times does not overpass the threshold value $M_y$, go back to step S102 to determine next phone number in the blacklist database.

In step S106, the server generates a crank phone number database for storing regional crank phone numbers and/or national crank phone numbers.

In step S107, the server generates an anti-crank policy according to crank phone number data. In step S108, the anti-crank policy is updated to the cell phone client. In step S109, when the cell phone gets an call, the client executes anti-crank policy to determine whether the phone number of the call is a crank phone number, if the phone number is a crank phone number, the client gives an alert. In step S110, the operation of anti-crank is successful and process is ended.

FIG. 1 shows just an embodiment of the present invention, which includes determining whether the times that the phone number in the blacklist database is added in the blacklist by users exceeds the threshold value $M_x$ or $M_y$. However, the present invention is not limited to what is described above; it can determine one of the conditions or change the sequence of the determining conditions, for example, determining whether $M_y$ is satisfied at first and then determining whether $M_x$ is satisfied.

Figure 2:
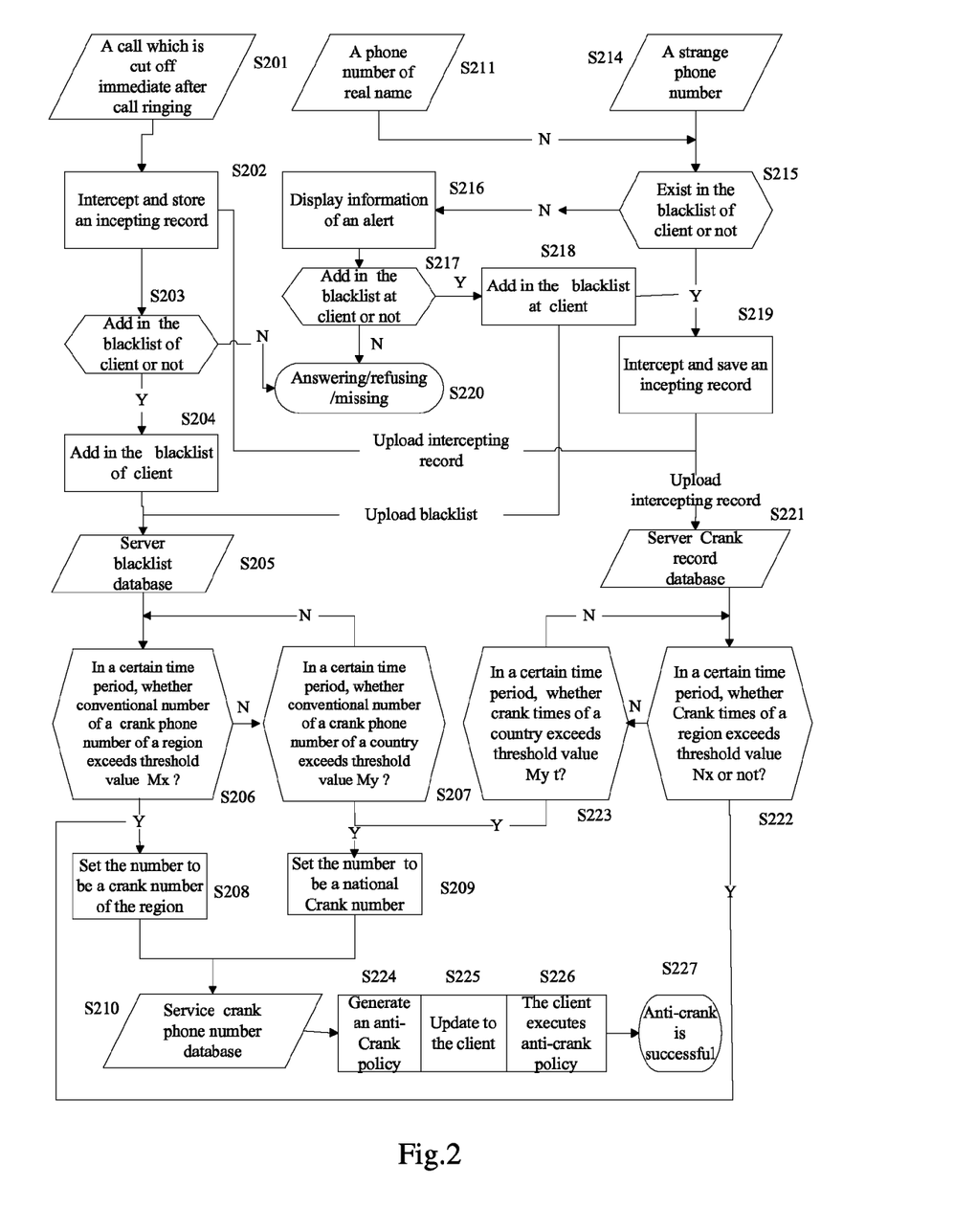
FIG. 2 is a flowchart illustrating a method for blocking crank calls according to another embodiment of the present invention.

Referring to FIG. 2, another embodiment for a method of blocking crank phone calls of the present invention is illustrated in the following.

In step S201, the cell phone client detects a phone number of a call which is cut off immediate after call ringing; in step S202, the client intercepts the call, records the phone number and uploads an intercepting record to the server; in step S221, the intercepting record is stored in a crank record database of the server. In step S203, the client asks the user whether adds the phone number into a blacklist of the client, if the user determines adding the phone number into the blacklist of the client, in step S204 the phone number is added into the blacklist of the client and in step S205 the blacklist is uploaded to the blacklist database at the server. If the phone number is not added into the blacklist at the client, go to step S220 to display that the call is not answered.

In step S211, the client detects a phone number with real name, i.e. a crank phone number of a known holder. For example, a phone number with real name refers to a collected phone number of a real estate agent, insurance sale or other sales, which is registered with a real name or half real name. For example, those kinds of phone numbers can be captured from some professional websites by Software Finder. In step S215, locally determine whether the phone number is in the blacklist of the client.

In step S214, the client detects a strange phone number; go to step S215; in step S215 the client determines whether the phone number is in the blacklist at the client. If the phone number is not in the blacklist at the client, in step S216 the client gives an alert to the user; in step S217, the client asks the user whether adds the phone number into the blacklist of the client, if the user determines adding the phone number into the blacklist at the client, in step S218 the client adds the phone number into the blacklist and in step S205 uploads the phone number to the blacklist database of the server. As adding the phone number to the blacklist of the client, the call of the phone number is intercepted and the phone number of the call is recorded in step S219. If the phone number is not added into the blacklist of the client, go to step S220, the call is answered, refused or missed.

If the phone number is determined to be in the blacklist at the client in step S215, the call is intercepted and the phone number is recorded in step S219. The client uploads intercepting record to the server and stores the intercepting record to the crank record database of the server in step S221.

For the phone number which is added in the blacklist in step S204 and step S218, the client uploads the blacklist to the server; and in step S205 stores the blacklist to the blacklist database at the server. In step S206, the server determines whether the times(regional crank phone number conventional number) that a phone number in the blacklist database is added by users of a region in a certain time period exceeds the threshold value Mx, if the times exceeds the threshold value Mx, in step S208 the phone number is set to be crank phone number of the region; if the times does not overpass the threshold value Mx, in Step 207 the server determines whether the phone number is added in the blacklist by users of N regions of a country in a certain time period and determines whether weighted average of times (national crank phone number conventional number) that the phone number is added by users of more than N regions exceeds the threshold value My, if the weighted average of times exceeds the threshold value My, in step S209 the phone number is set to be national crank phone number; if the weighted average of times does not overpass the threshold value My, go back to step S206 to determine next phone number in the blacklist database.

For the phone number which is uploaded and stored in the crank phone number database at the server in step S221, in step S222, the server determines whether the times, that the phone number in the crank phone number database harassed/ the phone number is added in the intercepting record in a region in a certain time period, exceeds the threshold value Nx, if the times exceeds the threshold value Nx, the phone number is set to be crank number of the region in step S208; if the times does not overpass the threshold value Nx, the server determines in a time period whether the phone number is added into the intercepting record by users of more than N regions and whether weighted average of times that the phone number is added into the intercepting record by users of more than N regions exceeds the threshold value Ny in step S223, if the weighted average of times exceeds the threshold value Ny, the phone number is set to be national crank phone number in step S209, if the weighted average of times does not exceeds the threshold value Ny, go back to step S222 to determine next phone number in the crank phone number database.

In step S210, the server generates the crank phone number database. In step S224, the server generates an anti-crank policy according to crank phone number data. In step S225, the anti-crank policy is updated to the cell phone client. In step S226, when a cell phone gets a call and if the client executes the anti-crank policy and detects that the phone number of the call is a crank phone number, the cell phone will give an alert. In step S227, anti-crank is successful and process is ended.

FIG. 2 shows just an embodiment of the present invention, which includes determining whether the times that a phone number in the blacklist database is added by users exceeds the threshold value Mx or My. However, the present invention is not limited to what is described above; it can determine one of the conditions or change the sequence of determining conditions, for example, determining whether My is satisfied at first and then determining whether Mx is satisfied. In like manner, determining whether Nx or Ny is satisfied is not limited to the illustration of FIG. 2; it can determine one of the conditions or change the sequence of the determining conditions.

The blacklist database can be updated regularly according to settings of the user. Alternatively, the blacklist database can respond the uploading of an anti-crank record so as to update automatically; for example, after successful anti-crank by the user, anti-crank policy client will upload an anti-crank record to the server; or the user is disturbed by an unknown crank call and submits the crank record actively to the server by the anti-crank policy client.

Figure 3:
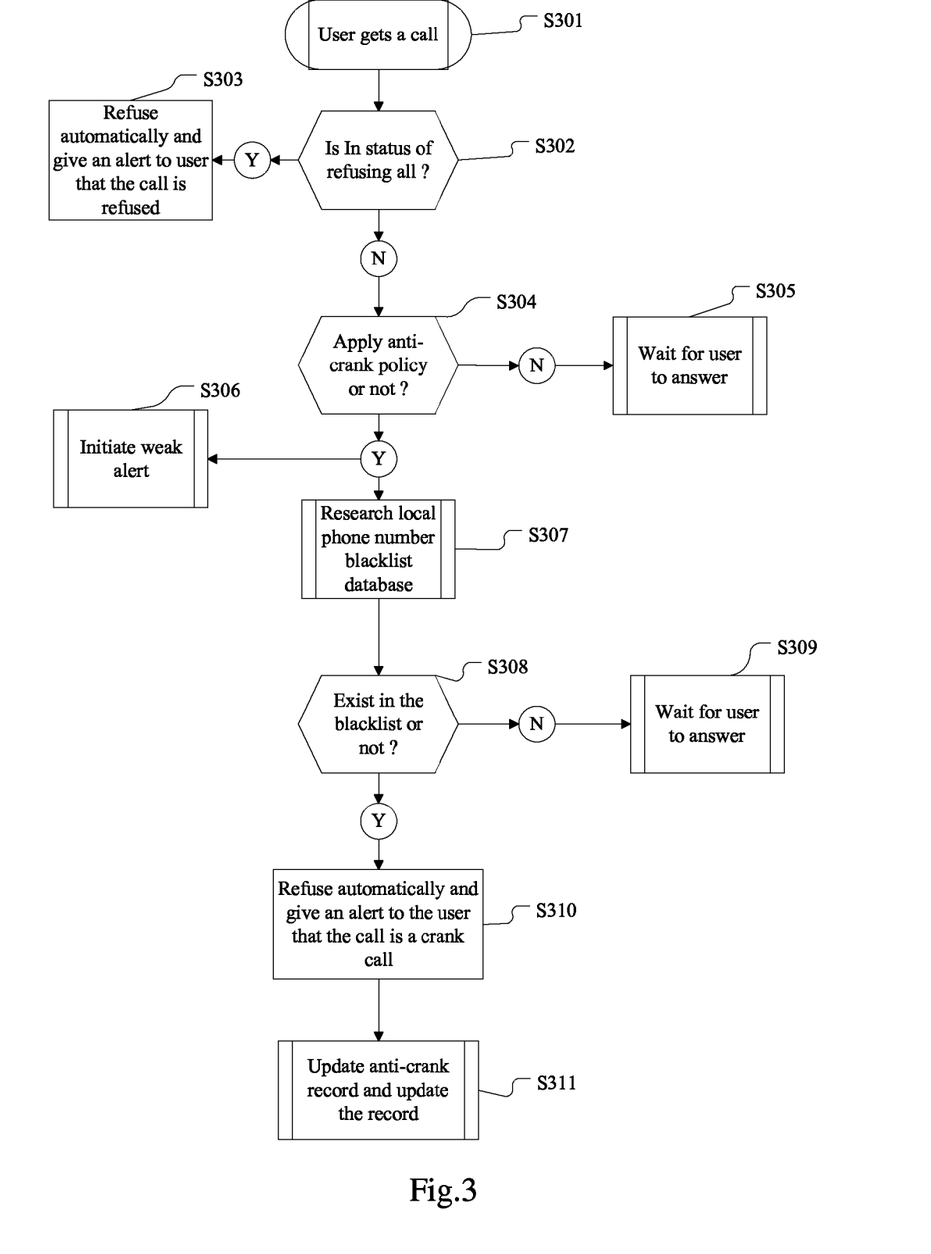
FIG. 3 is a flowchart illustrating executing anti-crank policy by a client according to an embodiment of the present invention.

According to an embodiment of the present invention and referring to FIG. 3, by taking an example of a cell phone with Symbian operating system platform, the anti-crank process of the client includes following steps:

(1) monitor process of executing program of the mobile device in real-time;

(2) in step S301, a user gets an incoming call and the user initiates and activates cell phone call receiving process CTelephony::AnswerincomingCall (3) in step S302, determine whether the current call status is refusing all. If the current call status is set to be refusing all, go to step S303 to terminate the incoming call automatically and prompt the user that the call is refused; if the current call status is not set to be refusing all, go to next step;

(4) In step S304, monitor whether the anti-crank policy is applied; if the cell phone is set be that anti-crank policy is not applied or the anti-crank policy does not exist, go to step S305 to wait for the user to answer the call; if the anti-crank policy is applied, go to next step;

Alternatively, the user can personalize settings of the anti-crank policy according to region code of a phone number; the phone user can decide that phone numbers of some regions may not be processed by the policy according to the region scope of his or her contacts; for example, for all of the calls from phone numbers started with region code "86-05" (Fujian province of China), the implementing of the policy is stopped and normal activities, such as ring tone, vibration, etc., for alerting incoming calls are initiated; otherwise, the anti-crank policy is initiated.

(5) In step S306, the anti-crank policy firstly including giving weak alert to the user; for example, ring tone in silent for a period of time, preferably 2 seconds (or delay 3 seconds by other ways). If the incoming call is a crank call, the phone user will not be disturbed. During that period of time, the incoming call alert, such as preset ring tone, vibration or background light, and the like, can be shut down temporarily.

(6) As activating weak alert, in step S307, inquire whether the phone number is in the blacklist Get the phone number information from the process of the incoming call and forward the information to the anti-crank policy client; the anti-crank policy client invokes the blacklist database to search the phone number of the incoming call. In step S308, determine whether the phone number is in the blacklist, if the phone number is in the blacklist, go to step S310 to refuse to answer the call automatically and activate cell phone portrait and give an alert that "The phone number may be a crank call" on the cell phone portrait.

According to an embodiment, the anti-crank policy client keeps the cell phone in weak alert status, activate cell phone portrait and gives an alert that "The phone number may be a crank call" on the cell phone portrait.

According to another embodiment, the anti-crank policy client terminates the process of the incoming call by terminating incoming call instruction "RMobileCall::HangUp( )" API so as to terminate the incoming call automatically.

(5) if the phone number of the incoming call is not in the blacklist database, go to step 309 of normal process, such as answering the incoming call, ending the weak alert status, restoring normal alert such as ring tone and waiting for the user to answer the call.

(6) In step S311, if the phone number of the incoming call is in the blacklist database, update the anti-crank record and upload the record to the crank record database at the server subsequently; and the crank record database updates corresponding record of the phone number according to the threshold values Mx and Ny.

The above cell phone with Symbian operating system platform and the process name such as CTelephony:, RMobileCall:, and so on, is taking as an example for illustrating the purpose of the present invention, which do not limit the scope of the invention. Those skilled in the art can appreciate that other cell phone operating platforms, such as Android or IOS system can implement the technical solution of the present invention as well.

Figure 4:
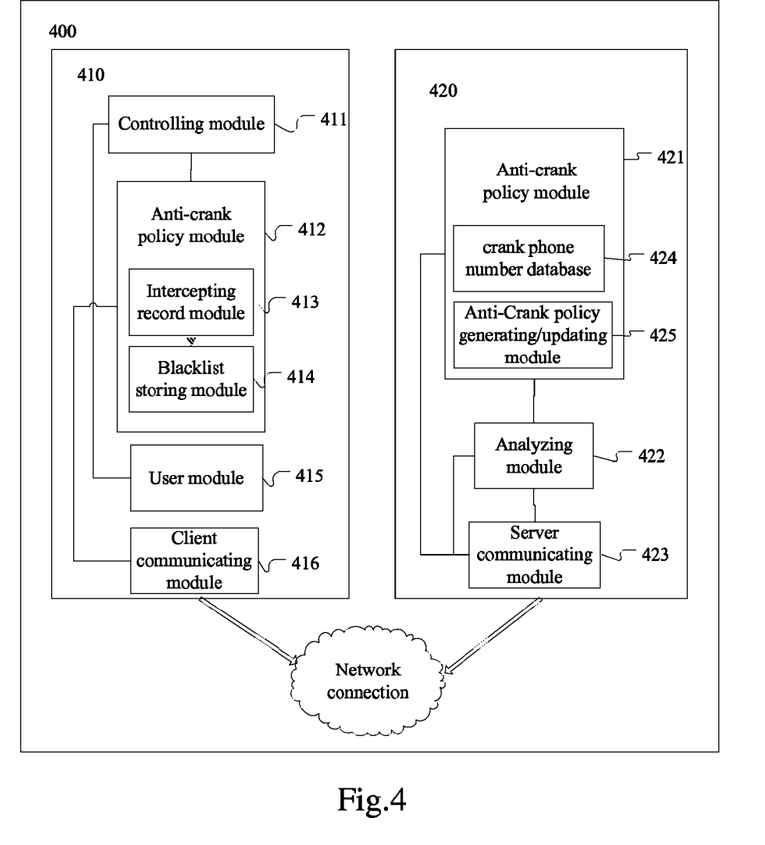
FIG. 4 is a systematic diagram illustrating executing the method for blocking crank calls of the present invention.

According to an embodiment of the invention, a system of blocking crank calls by using cloud computing is shown as FIG. 4. The system of blocking crank call 400 includes a client 410 and a server 420. The client 410 includes a controlling module 411, an anti-crank policy module 412, a user module 415 and a client communicating module 416. The server 420 includes an anti-crank policy module 421, an analyzing module 422 and a server communicating module 423. The anti-crank policy module 421 further includes a crank phone number database 424 and an anti-crank policy generating/updating module 425. The client communicating module 416 communicates with the server communicating module 423 to implement the communication between the client 410 and the server 420.

The client module 410 is installed on a mobile communicating device such as a cell phone which has capabilities of storing and computing. The controlling module 411 can communicate with the anti-crank policy module 412 and the mobile communicating device. The controlling module 411 receives anti-crank controlling instructions, such as refusing to answer a call, from the anti-crank policy module 412. The controlling module 411 executes anti-crank controlling instructions to control the functions of the cell phone, such as terminating the process of an incoming call and giving an alert to the user that the refused incoming call is a crank call.

The anti-crank policy module 412 communicates with the user module 415, the controlling module 411 and the client communicating module 416. The anti-crank policy module 412 can receive personalized settings of a user by the user module 415; For example, anti-crank policy is not applied on phone numbers of a specific region or phone numbers of the specific region require the user to confirm by activating the anti-crank policy manually. The anti-crank policy module 412 outputs the anti-crank policy to the controlling module 411, for example, refusing to answer a call of a crank phone number or giving an alert to the user, etc.

The anti-crank policy module 412 further includes an intercepting record module 413 and a blacklist storing module 414. The intercepting record module 413 communicates with the user module 415 and the client communicating module 416; when the cell phone user sets a phone number to be crank phone number by the user module 415, the phone number is stored in the blacklist storing module 414. Or the controlling module 411 uses the anti-crank policy to automatically intercept a call which is cut off immediate after call ringing and stores the call in an intercepting record. The intercepting record, a blacklist and user information is uploaded to the server 420 by the client communicating module 416.

The user module 415 provides a human-machine interface; the user module 415 can provide operable options for the user to select; for example, receiving personalized settings of the user by the user module 415; after the cell phone receives an incoming call or a short message, the user can manually define the phone number of the incoming call or the short message to be crank phone number by the user module 415 and store the phone number into the blacklist storing module 414.

The blacklist storing module 414 communicates with the anti-crank policy module 421 and the client communicating module 416. The anti-crank policy module 412 can read the data in the blacklist storing module 414 and intercept crank calls or crank short messages, and so on, by the controlling module 411. According to the settings of the user, the blacklist storing module 414 can communicate with the server by the client communicating module 416 regularly and download update of the blacklist.

The server communicating module 423 communicates with the client 410, the anti-crank policy module 421 and the analyzing module 422. The server communicating module 423 receives the intercepting record, the blacklist and the user information from the client 410. The update of the anti-crank policy is sent to the client 410 by the server communicating module 423.

The analyzing module 422 communicates with the server communicating module 423 and the anti-crank policy module 421. The analyzing module 422 receives the intercepting record, the blacklist and user information from the client 410 by the server communicating module 423, stores them in the crank phone number database 424 and determines whether the crank phone number is a regional crank phone number or a national crank phone number according to statistics of an anti-crank record. The analyzing module 422 outputs the result of determination to the anti-crank policy module 421.

The anti-crank policy module 421 communicates with the analyzing module 422 and the server communicating module 423. The anti-crank policy module 421 receives the analyzing result of the crank phone number from the analyzing module 422 and generates the anti-crank policy by the anti-crank policy generating/updating module 425. For example, if a phone number belongs to crank phone number of a region, the policy can be configured in the region only; if the phone number belongs to crank phone number of a country, the policy is configured to all of the regions of the country. The generated or updated anti-crank policy is sent to the client 410 by the server communicating module 423.

Alternatively, many client s 410 are installed on different cell phones respectively, which cross over regions or administrative regions and are configured with different anti-crank policies according to the belonged region or administrative region.

According to an embodiment of the present invention, the anti-crank policy can execute different anti-crank operation according to the attribution of the incoming call in the blacklist database specifically; for example, for the national crank incoming calls, give no alert and hang up the incoming call directly; for the regional crank incoming calls, give a weak alert at first and alert the user that the incoming call is a regional crank call.

According to the options provided by the anti-crank policy client, the user can set responding activities, such as weak alert, hang up directly, message alert and answering call, and so on, for every kind of crank call.

Specific embodiments of and examples for the invention are described above for illustrative purposes. The above detailed description of the embodiments of the invention is not to be exhaustive or limit the invention to the precise form disclosed above. Obviously, various variants and modifications are possible according to the above disclosure. The embodiments are chosen and described so that those skilled in the art can appreciate and understand the principles and practices of the present invention and alternatives and modifications. In fact, the scope of the invention is limited by the appended claims and equivalents thereof.

What is claimed is:

1. A method for blocking crank calls by using cloud computing, the method comprising:
   sending a blacklist to a server by a client;
   making statistics according to blacklist data uploaded by the client;
   determining that a particular phone number is a crank phone number;
   generating an anti-crank policy and updating the generated anti-crank policy to the client by the server;
   when receiving a call or a message from the crank phone number, the client giving an alert that the phone number is a crank phone number;
   wherein the making statistics according to the blacklist data uploaded by the client and determining the particular phone number as a crank phone number by the server comprises:
      in a predetermined time period T, when a number of times that a phone number is added in the blacklist by users of a region exceeds threshold value Mx, the phone number is defined as a crank phone number of the region; and
      in a predetermined time period T, when a phone number is added in the blacklist by users of more than N regions and weighted average of a number of times that the phone number is added in the blacklist by the users of the N regions exceeds threshold value My, the phone number as defined as a national crank phone number;
   wherein the method further comprises:
   storing an intercepting record and uploading the intercepting record to the server by the client;
   making statistics by the server according to the intercepting record uploaded by the client; and
   determining that the particular phone number is the crank phone number and generating the anti-crank policy,
   wherein the making statistics by the server according to the intercepting record uploaded by the client comprises:
      in the predetermine time period T, when the number of times that a phone number is added in the blacklist by users of a region exceeds threshold value Nx, the phone number is defined as a crank phone number of the region; and
      in the predetermined time period T, when a phone number is added in the intercepting record by users of more than N regions and a weighted average of a number of times that the phone number is added in the intercepting record by the users of the N regions exceeds threshold value Ny, the phone number is defined as a national crank phone number.

2. The method of claim 1, further comprising
   adding a phone number of a crank call or a crank short message in the blacklist by the client via selection of the user.

3. The method of claim 1, wherein updating the generated anti-crank policy to the client comprises
   arranging a regional crank phone number in a blacklist of a client of the region;
   arranging a national crank phone number in the blacklists of all clients of a country;
   executing the anti-crank policy comprises giving weak alert for a crank call or a crank short message, automatically refusing a crank call or a crank short message and/or giving an alert to the users that a call or a short message is the crank one.

4. The method of claim 1, wherein the intercepting record includes at least one of: a record that the client intercepts a call, which is cut off immediately after call ringing; an intercepting record set by the user manually; and a call refused by the users of a region.

* * * * *